(12) United States Patent
Rossetti

(10) Patent No.: US 10,752,310 B2
(45) Date of Patent: Aug. 25, 2020

(54) COCKPIT FOR A TWO-WHEELED VEHICLE

(71) Applicant: AUDI AG, Ingolstadt (DE)

(72) Inventor: Mario Rossetti, Neudenau (DE)

(73) Assignee: AUDI AG, Ingolstadt (DE)

( * ) Notice: Subject to any disclaimer, the term of this patent is extended or adjusted under 35 U.S.C. 154(b) by 58 days.

(21) Appl. No.: 16/090,356

(22) PCT Filed: Apr. 13, 2018

(86) PCT No.: PCT/EP2018/059496
§ 371 (c)(1),
(2) Date: Oct. 1, 2018

(87) PCT Pub. No.: WO2018/189358
PCT Pub. Date: Oct. 18, 2018

(65) Prior Publication Data
US 2019/0161134 A1    May 30, 2019

(30) Foreign Application Priority Data

Apr. 15, 2017   (DE) .......................... 10 2017 003 688

(51) Int. Cl.
B62J 17/08      (2020.01)
B62J 99/00      (2020.01)
(Continued)

(52) U.S. Cl.
CPC ............... B62J 17/08 (2013.01); B60K 37/02 (2013.01); B62J 6/16 (2013.01); B62J 17/04 (2013.01);
(Continued)

(58) Field of Classification Search
CPC ................ B60K 37/02; B60K 2370/67; B60K 2370/152; B60K 2370/87; B60K 2370/77; B62J 17/08; B62J 6/16; B62J 17/04; B62J 99/00; B62J 50/20; B62J 50/225; B62K 21/12; B62K 23/04; B62K 2202/00; B62L 3/02
See application file for complete search history.

(56) References Cited

U.S. PATENT DOCUMENTS 4,947,955 A    8/1990   Hopely, Jr.
7,451,848 B2 * 11/2008  Flowers ................. A61G 5/045
                                               180/208

(Continued)

FOREIGN PATENT DOCUMENTS

CN    202573834 U    12/2012
CN    203093768 U     7/2013
(Continued)

OTHER PUBLICATIONS

Examination Report dated Sep. 8, 2017 of corresponding German application No. 10 2017 003 688.8; 5 pgs.
(Continued)

Primary Examiner — D Glenn Dayoan
Assistant Examiner — Melissa Ann Bonifazi
(74) Attorney, Agent, or Firm — Maier & Maier, PLLC

(57) ABSTRACT

A cockpit for a two-wheeled vehicle has a base body, on which a display and a steering handle are attached. The base body is pivotably mounted at a bodywork of the two-wheeled vehicle.

9 Claims, 5 Drawing Sheets

(51) Int. Cl.
 B62J 17/04 (2006.01)
 B62K 21/12 (2006.01)
 B62K 23/04 (2006.01)
 B62L 3/02 (2006.01)
 B62J 6/16 (2020.01)
 B60K 37/02 (2006.01)
 B62J 50/20 (2020.01)
 B62J 50/21 (2020.01)

(52) U.S. Cl.
 CPC ............... *B62J 99/00* (2013.01); *B62K 21/12* (2013.01); *B62K 23/04* (2013.01); *B62L 3/02* (2013.01); *B60K 2370/152* (2019.05); *B60K 2370/67* (2019.05); *B60K 2370/77* (2019.05); *B60K 2370/87* (2019.05); *B62J 50/20* (2020.02); *B62J 50/225* (2020.02); *B62K 2202/00* (2013.01)

(56) References Cited

U.S. PATENT DOCUMENTS

| | | |
|---|---|---|
| 2003/0112135 A1 | 6/2003 | Yamagiwa et al. |
| 2005/0121935 A1* | 6/2005 | Bell ..................... B62J 17/02 296/78.1 |
| 2008/0023980 A1 | 1/2008 | Kayoukluk |
| 2011/0139535 A1 | 6/2011 | Jhao |
| 2016/0137254 A1 | 5/2016 | Lee |

FOREIGN PATENT DOCUMENTS

| | | |
|---|---|---|
| DE | 25 11 901 A1 | 9/1976 |
| DE | 101 56 725 A1 | 5/2002 |
| DE | 20 2012 104 592 U1 | 2/2013 |
| DE | 10 2013 204 130 A1 | 11/2013 |
| EP | 0 891 920 A2 | 1/1999 |
| EP | 2 106 993 B1 | 2/2012 |

OTHER PUBLICATIONS

International Search Report and Written Opinion of the International Search Authority with a partial English translation dated Jul. 19, 2018 of corresponding International application No. PCT/EP2018/059496; 15 pgs.

Office Action dated Jan. 19, 2020 in corresponding Chinese Application No. 201880001934.3; 13 pages including English-language translation.

\* cited by examiner

COCKPIT FOR A TWO-WHEELED VEHICLE

FIELD

The invention relates to a cockpit for a two-wheeled vehicle, with a base body on which a display and a steering handle are attached.

BACKGROUND

Cockpits of this kind for two-wheeled vehicles are known from the general prior art. These cockpits are mostly suited only for a specific group of persons, in particular in regard to the positioning of the steering handle, whereas other persons, in particular smaller or larger persons can correctly grip the steering handle only in a position on the two-wheeled vehicle that is not suited to them. The reading of a display on the cockpit is also often possible only conditionally. This is not only a discomfort for these persons, but can even lead to traffic hazards under certain driving situations.

Known from US 2016/0137254 A1 is a cockpit for a two-wheeled vehicle, which is attached to a steering column. The steering column has a hinge, so that it can be folded. In this way, the entire two-wheeled vehicle can be folded together for the purpose of transport.

US 2011/0139535 A1 describes a cockpit for a four-wheeled vehicle, which is mounted to a steering column so as to pivot around a horizontal axis.

Another cockpit for a two-wheeled vehicle is described in DE 101 56 725 A1. In this case, a handlebar is constructed in one piece with the cockpit.

Known from U.S. Pat. No. 4,947,955 is a vehicle with a cockpit that is connected to a steering column by means of a joint.

EP 2 106 993 B1 describes a collapsible two-wheeled vehicle, the steering column of which can be adjusted in height.

SUMMARY OF THE DISCLOSURE

It is the object of the present invention to create a cockpit for a two-wheeled vehicle that is suited for a substantially larger number of users of the two-wheeled vehicle than are the known solutions.

By the pivotable arrangement of the base body to the bodywork of the two-wheeled vehicle according to the invention, a very simple adaptation of the position of the cockpit relative to the respective wish of the user is possible. Said user can thereby not only grip the steering handle more simply, but also bring the display attached to the base body into a position in which it is easier for the user to read. In this way, not only is comfort for the user increased, but also safety during operation of the two-wheeled vehicle is increased.

The invention can be realized in an especially simple manner by connecting the base body to the bodywork at an axis of pivot extending at least approximately horizontally to the bodywork.

Furthermore, in one embodiment of the invention, it can be provided that the base body is lockable in at least two positions with respect to the bodywork. This makes possible a secure fastening of the base body and, accordingly, of the entire cockpit to the bodywork.

An especially simple fastening or locking of the cockpit is possible if the base body is lockable with respect to the bodywork by means of a quick release.

Additionally or alternatively, it can also be provided that the base body can be arranged in defined locked positions with respect to the bodywork. A simpler shift in position of the cockpit can thereby result.

Another advantageous embodiment of the invention can consist in the fact that the base body is formed as a frame, which surrounds the display at least partially. In this way, the ability to adjust the cockpit in position can be separated from the functional embodiment of the display in a very simple manner.

In order to make possible a simple operation of the two-wheeled vehicle that is equipped with the cockpit according to the invention, it can further be provided that the steering handle has a plurality of control elements.

It is especially advantageous in this case if the control elements comprise a throttle grip, a brake lever, and/or a blinker switch.

BRIEF DESCRIPTION OF THE DRAWINGS

Further advantageous embodiments and enhancements of the invention ensue from the remaining dependent claims. An exemplary embodiment of the invention is presented below in terms of the principle thereof on the basis of the drawing.

Shown are.

DETAILED DESCRIPTION

Figure 1:
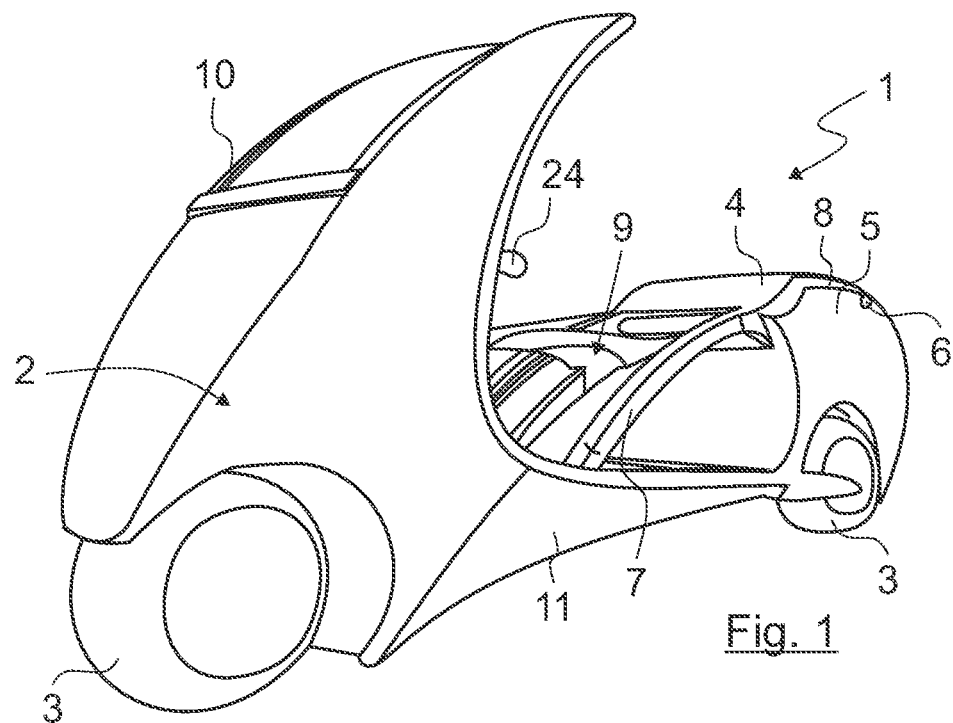
FIG. 1 a perspective view of a two-wheeled vehicle with a roof element in a first position.

FIG. 1 shows a two-wheeled vehicle 1, in the present case a scooter, with a bodywork 2. Attached to the bodywork 2 are, among other things, two wheels 3, which can be seen better in the side views of FIGS. 2 and 3.

Figure 2:
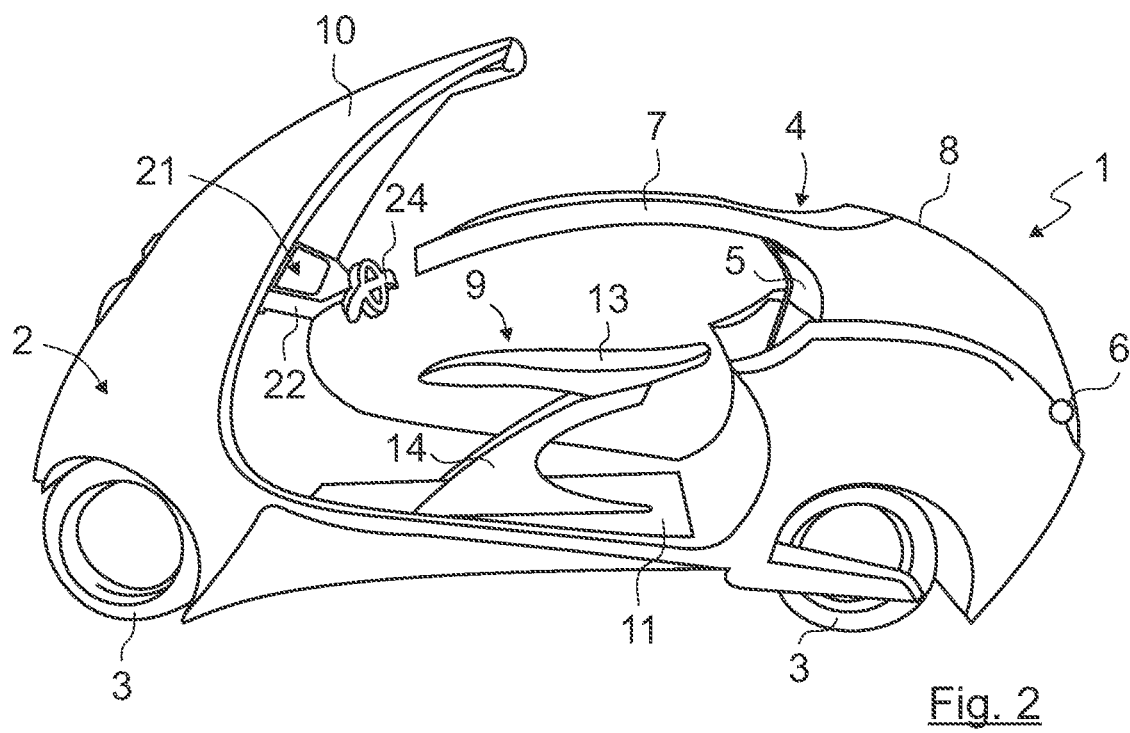
FIG. 2 a side view of the two-wheeled vehicle from FIG. 1 with the roof element in an intermediate position.
Figure 3:
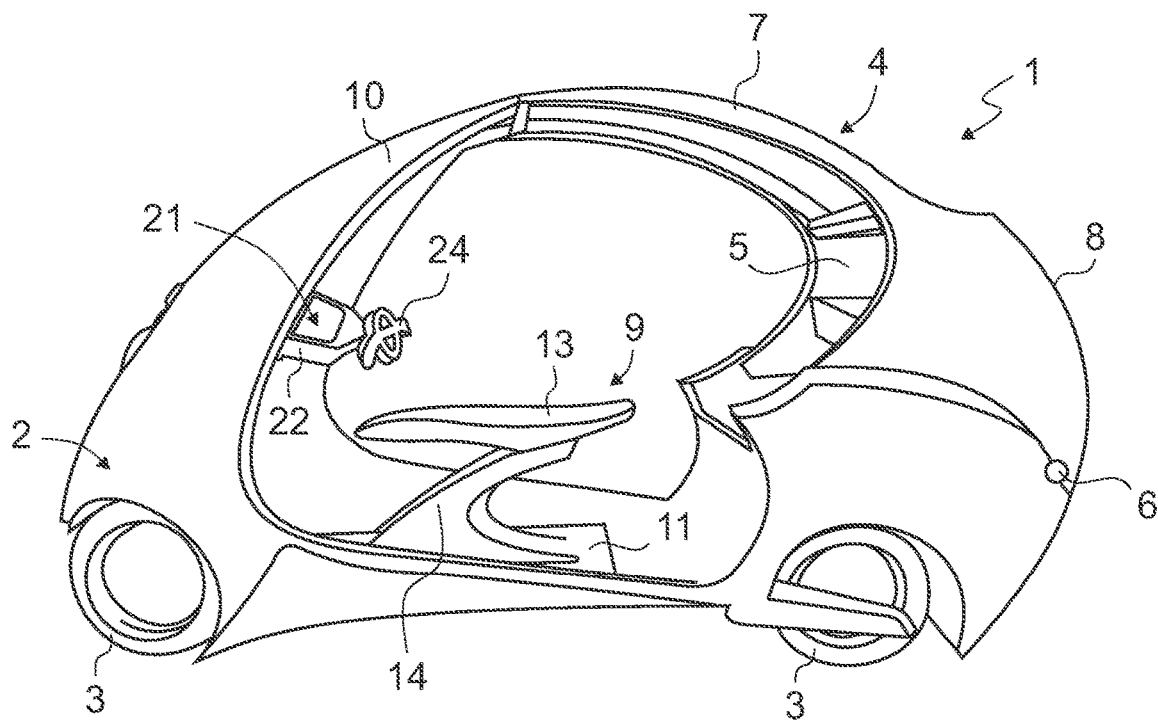
FIG. 3 the two-wheeled vehicle from FIG. 2 with the roof element in a second position.

The bodywork 2 has a roof element 4 and a storage compartment 5. As described in detail below, the roof element 4 is mounted on an axis of pivot 6 so as to be able to pivot between at least two positions. FIG. 1 shows a first, lower position of the roof element 4, FIG. 2 shows an intermediate position of the roof element 4, and FIG. 3 shows a second, upper position thereof. In the present case, the axis of pivot 6 is provided in a rear region of the bodywork 2, thereby leading to an optimal usability of the storage compartment 5. The axis of pivot 6 of the roof element 4 can be realized with respect to the bodywork 2 in a way that is known in and of itself.

Figure 4:
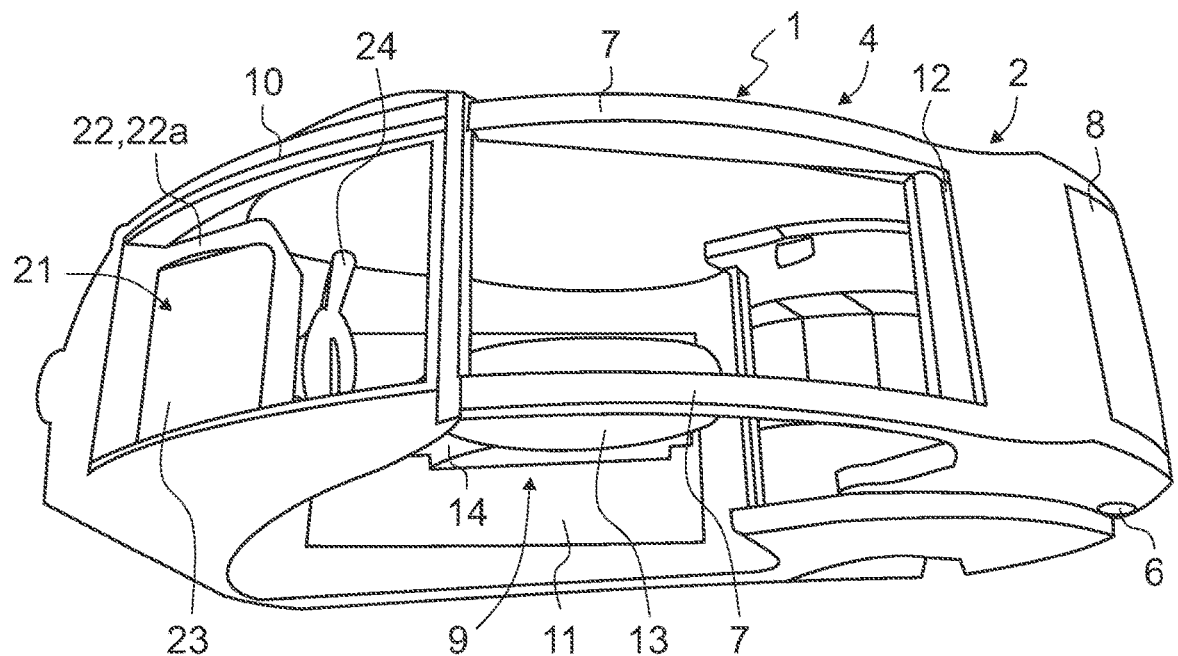
FIG. 4 a plan view of the two-wheeled vehicle in accordance with FIGS. 1 to 3.
Figure 5:
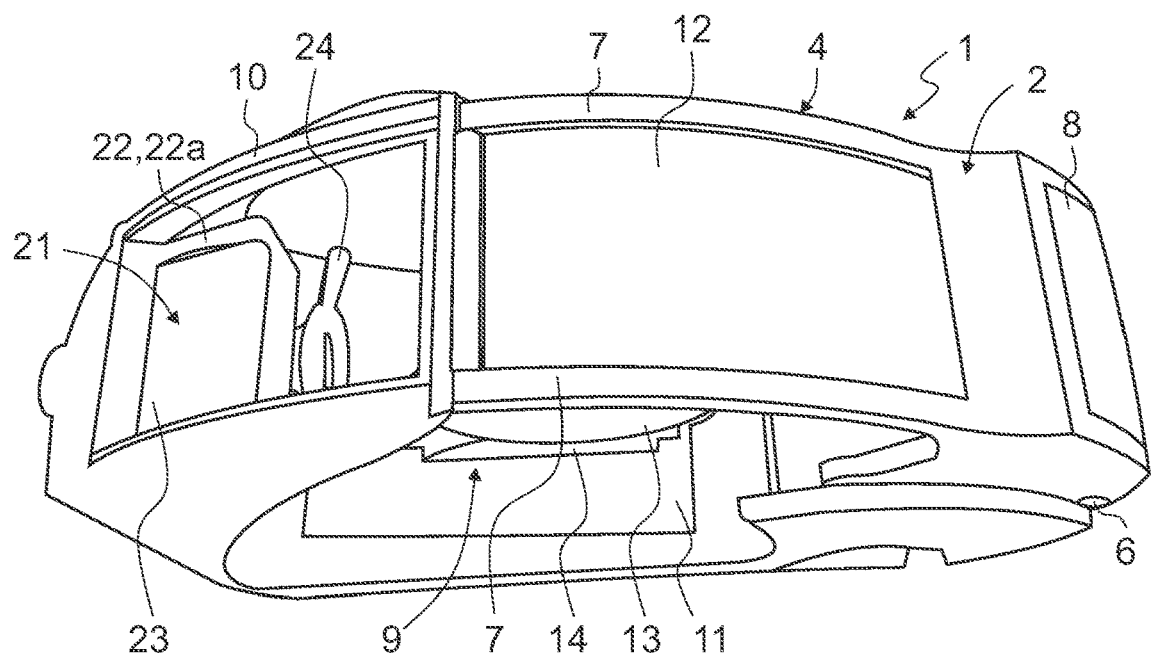
FIG. 5 a plan view in accordance with FIG. 4 with a covering element in another position.

As can also be seen in FIGS. 1 to 3 as well as in the plan views of FIGS. 4 and 5, the roof element 4 has two roof rails or roof struts 7 that extend parallel to each other. The roof struts 7 are connected to a cover 8 for the storage compartment 5 or are designed in one piece therewith, said cover likewise being a part of the roof element 4 and is moved with it.

In FIG. 1, it can be seen that, in the first, lower position of the roof element 4, the roof struts 7 are arranged lateral to a driver's seat 9 of the bodywork 2 of the two-wheeled vehicle 1. In this first, lower position of the roof element 4, the storage compartment 5 has a reduced volume and is closed by means of the cover 8. In contrast, in the second, upper position of the roof element 4, the roof struts 7 are arranged above the driver's seat 9 and the storage compartment 5 has an enlarged volume. In this position of the roof element 4, the volume of the storage compartment 5 can be, for example 120-150 liters. In this position of the roof element 4, illustrated in FIG. 3, it is possible for a driver, who is not illustrated and is seated on the driver's seat 9, to reach directly into the storage compartment 5, because, in this position of the roof element 4, said storage compartment is opened. Fundamentally, it would be conceivable to close this opening of the storage compartment 5 in the direction of the driver by means of a roll closure or a similar separating device.

Through the described embodiment of the roof element 4, in the lower position of the roof element 4, the two-wheeled vehicle 1 can be operated as a conventional scooter, which, however, in comparison to known scooters, has an enlarged transport volume as a result of the storage compartment 5. In the upper position of the roof element 4, a wind and weather protection for the driver as well as an enlarged transport volume results owing to the further enlarged volume of the storage compartment 5.

In this case, the curved shape of the roof element 4 with the roof struts 7 and the cover 8, in both positions of the roof element 4, results in a very harmonic overall appearance of the bodywork 2 and, accordingly, of the entire two-wheeled vehicle 1.

In both of its positions, that is, in the first, lower position as well as in the second, upper position, the roof element 4 is lockable. For example, in the present case, in the upper position of the roof element 4, the roof struts 7 are connected to a windshield frame 10 of the bodywork 2 and it can be provided that the roof struts 7 are designed so that they can lock to the windshield frame 10. Obviously, the locking of the roof struts 7 can be made in another region as well. In the lower position of the roof element 4, the locking of the roof struts 7 to a floor assembly 11 of the bodywork 2 of the two-wheeled vehicle 1 is also conceivable. For example, it is also possible, however, to lock the roof element 4 in the region of the axis of pivot 6, thereby enabling a locking of the roof element 4 in both positions, as well as, optionally, in intermediate positions. Combinations thereof are also conceivable.

In this case, the windshield frame 10 is extended relatively far upwards and accordingly offers a good wind and weather protection. The connection of the windshield frame 10 to the roof element 4 results in a bodywork 2 that is completely closed, at least at the top side. In a way that is not illustrated, it is possible to provide corresponding coverings also in the two lateral regions of the bodywork 2, for example in the form of suitable tarps or films, in order to achieve an even better weather protection.

In a way that is not illustrated, the roof struts 7 can be designed such that they can be retracted into the roof element 4. As a result, the roof struts 7 would no longer be situated lateral to the driver's seat 9, but rather behind the latter. Improved spatial relationships thereby result, in particular for a vehicle occupant situated on driver's seat 9. In their state in which they are retracted into the roof element 4, the roof struts 7 optionally can be locked.

In FIGS. 4 and 5, it can be seen that, between the roof struts 7, a covering element 12 is provided, which can be shifted between an opened position, which is nearly reached in FIG. 4, and a closed position, which is illustrated in FIG. 5. Obviously, intermediate positions of the covering element 12 are also conceivable. In the position of the roof element 4 in accordance with FIG. 1, the covering element 12 should be situated in its opened position, so that the roof element 4 can be brought into its lower position, without the covering element 12 colliding with the driver or with the driver's seat 9.

The covering element 12 can be accommodated in a receiver, which is not illustrated, in the storage compartment 5. There, the covering element 12 can be rolled up or wound up, for example, when it is made of a corresponding flexible material. Instead of a covering element 12 that can be wound up, the latter can be constructed from a plurality of parts and, optionally, can be foldable. Fundamentally, the covering element 12 can be composed of a suitable plastic material, and in fact, a plastic film or a harder plastic material depending on the design.

Optionally, both the movement of the roof element 4 and the movement of the covering element 12 can result from and, optionally, can be controlled by a pneumatic, hydraulic, or electric drive. In the case of such a control, it is obviously conceivable to bring the covering element 12 into its opened position before the roof element 4 is brought into its lower position. However, a purely manual actuation of the roof element 4 and/or of the covering element 12 is also conceivable.

For the drive of the two-wheeled vehicle 1, it is possible to provide an electric motor, which is not illustrated, as a drive source. Said electric motor can be arranged, for example, in a wheel hub of one of the wheels 3. Furthermore, batteries or at least one battery supplying said electric motor with electric power can be arranged in the floor assembly 11 of the bodywork 2. However, this is also not illustrated in the figures. Optionally, the drive of the two-wheeled vehicle 1 can also be produced by a conventional internal combustion engine. Obviously, hybrid, plug-in hybrid, and other suitable drive sources are also possible.

Figure 6:
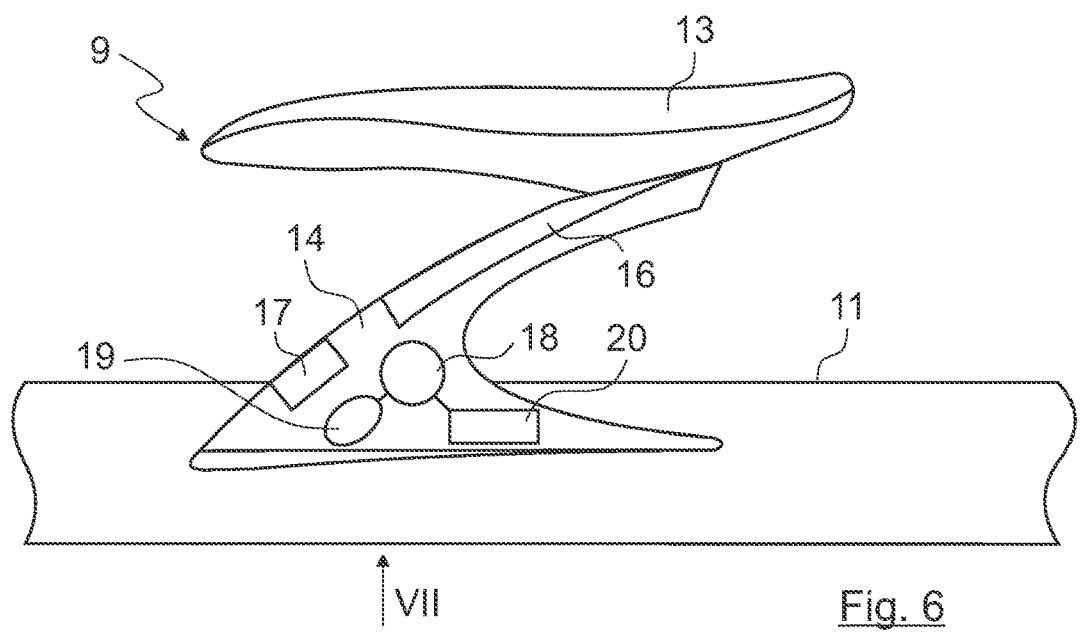
FIG. 6 a side view of a driver's seat of the two-wheeled vehicle.
Figure 7:
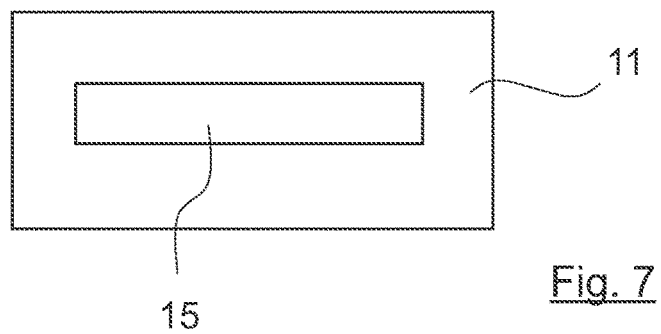
FIG. 7 a view in accordance with the arrow VII from FIG. 6.

FIGS. 6 and 7 show the driver's seat 9 of the two-wheeled vehicle 1 in a detailed illustration. The driver's seat 9 has a seat surface 13, which, in the present case, is formed as a double seat bench, and a console 14 for connection of the seat surface 13 to the bodywork 2—in the present case, to the floor assembly 11. In this case, the console 14 is arranged so as to be shifted in position with respect to the bodywork 2 in the longitudinal direction of the two-wheeled vehicle indicated by "x". With respect to the console 14, the seat surface 13 is arranged so as to be shifted in position at least in the vertical direction of the two-wheeled vehicle 1 indicated by "z".

As can be seen in the view of FIG. 7, the console 14 is borne in a guide 15 of the bodywork 2—in the present case, the floor assembly 11. In this case, the console 14 can be shifted continuously in the guide 15 and can be lockable with respect to the bodywork 2. For locking the console 14 with respect to the guide 15 of the bodywork 2, it is possible to provide, for example, a quick release, which is not illustrated.

It ensues from FIG. 6 that the seat surface 13 is borne in a guide 16 in the console 14. In this case, the guide 16 extends in a curve, so that a shift in position of the seat surface 13 with respect to the console 14 in the vertical direction z entails a shift in position of the seat surface 13 also in the horizontal direction x. Preferably, the seat surface 13 can also be shifted continuously in the console 14.

In the exemplary embodiment illustrated, the guides 15 and 16 are each designed as a groove, in which a corresponding part of the console 14 or of the seat surface 13 engages.

In addition, the console 14 has a storage compartment 17, in which the user of the two-wheeled vehicle 1 can place various objects, and which, optionally, can be closed with a cover, which is not illustrated. Furthermore, in the present case, parts of a drive device of the two-wheeled vehicle are arranged inside the console 14. Specifically, what can be involved here is a very schematically indicated electric motor 18, a transmission 19, and/or a battery 20. The electric motor 18, the transmission 19, and/or the battery 20 can be provided in addition to or instead of the above-described electric motor arranged in the wheel 3 and the above-described battery arranged in the floor assembly 11. The transmission 19 can be, for example, an automatic transmission, which can be designed, for example, as a belt transmission.

Figure 8:
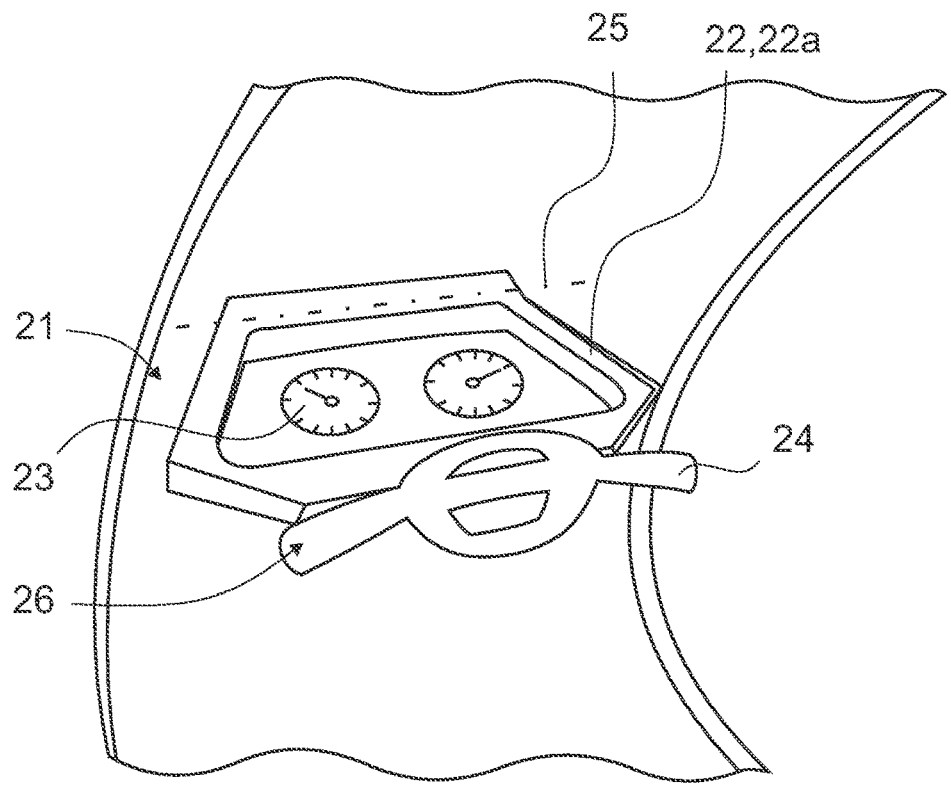
FIG. 8 a perspective view of a cockpit of the two-wheeled vehicle in accordance with the invention in a first position.
Figure 9:
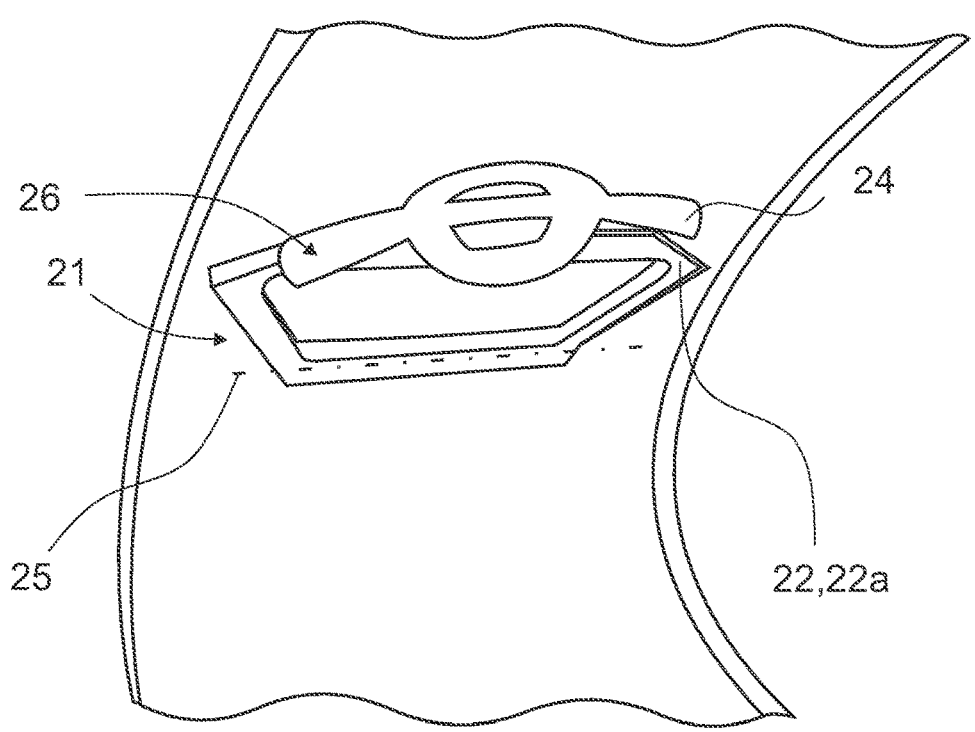
FIG. 9 a view of the cockpit in accordance with FIG. 8 in a second position.

FIGS. 8 and 9 show a cockpit 21 of the two-wheeled vehicle 1. The cockpit 21 has a base body 22, on which a display 23 and a handlebar or a steering handle 24 are attached.

In order to enable the cockpit to be adapted to different users or drivers of the two-wheeled vehicle 1, the base body 22 is pivotable on the bodywork 2 of the two-wheeled vehicle 1. In the present case, the base body 22 is connected to the bodywork 2 at an at least approximately horizontally extending axis of pivot 25. In this case, the axis of pivot 25 is situated in the region of the windshield frame 10.

In this case, it can be provided that the base body 22 can be locked in at least two positions and, optionally, also in a plurality of positions with respect to the bodywork 2. This lockability of the base body 22 with respect to the bodywork 2 can be ensured using a quick release or a similar device, which is not illustrated. Additionally or alternatively, it is also possible to arrange the base body 22 in defined locking positions with respect to the bodywork 2.

In the present case, the base body 22 is formed as a frame 22a, which surrounds the display 23 at least partially. In the illustrated exemplary embodiment, the frame 22a is trapezoidal in shape and surrounds the display 23 on all four sides.

The steering handle 24 or the handlebar has a plurality of control elements 26. In the present case, the control elements 26 comprise a throttle grip, a brake lever, and a blinker control. Obviously, additional control elements 26, such as, for example, a clutch lever, can be provided or various control elements 26 can also be left out.

The connection from the steering handle 24 to the steered wheel 3 can also be shifted during this shift in position of the cockpit 21. Furthermore, this connection can also be designed as a so-called drive-by-wire steering, which is known in and of itself, so that there is no mechanical connection between the steering handle 24 and the front wheel 3.

Figure 10:
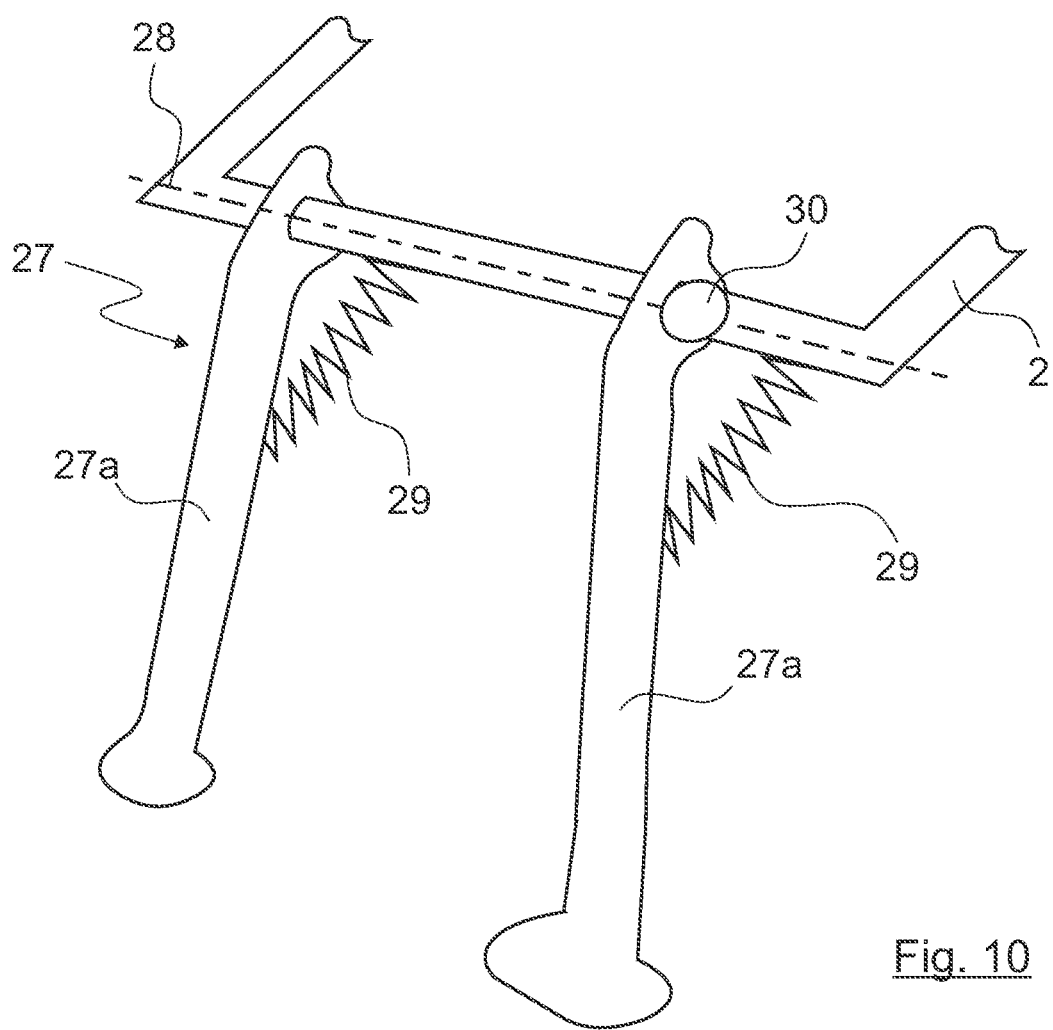
FIG. 10 a stand for the two-wheeled vehicle.

Illustrated in FIG. 10 is a stand 27, with which the two-wheeled vehicle 1 can be parked on the ground. The stand 27 has a stand section 27a, which is pivotably mounted between an upper position and a lower position on an axis of pivot 28 at the bodywork 2. In the lower position of the stand segment 27a, the stand 27 offers a support of the bodywork 2 and, accordingly, of the two-wheeled vehicle 1 on the ground.

Furthermore, the stand 27 has a spring element 29, which is designed such that it presses the stand segment 27a downward owing to the spring force. Serving to return the stand segment 27a to the upper position in the present case is a drive device, which is formed as an electric motor 30 and is capable of bringing about a pivoting movement of the stand segment 27a around its axis of pivot 28 at the bodywork 2. The electric motor 30 can be arranged, for example, directly at the axis of pivot 28, at which the stand 27 of the bodywork 2 is pivotably mounted.

In this case, the stand segment 27a can be moved downward into such a position that the wheels 3 nonetheless rest on the ground. In this way, the spring element 29 would have to be designed only strong enough therefor and it would not be necessary for said spring element to raise the entire weight of the two-wheeled vehicle 1. In any case, the stand 27 will prevent the two-wheeled vehicle 1 from tipping over. At its lower end, the stand segment 27a can be provided with wheels, which are not illustrated, and which make possible a maneuvering of the two-wheeled vehicle 1 even when the stand 27 is unfolded down.

Furthermore, a locking device, which is not illustrated, can be provided, with which the stand segment 27a can be locked in the upper position, so that it is not necessary constantly to operate the electric motor 30 in order to keep the stand segment 27a in the upper position. In the present case, the stand segment 27a is essentially U-shaped in form. However, it would also be possible to provide two mutually independent stand segments 27a or solely one stand segment 27a, which would instead be designed in the form of a side stand instead of in the form of a main stand.

All of the above-described lockings or locking devices of the individual components or elements of the two-wheeled vehicle 1 can be realized in a diversity of ways, such as, for example, manually, pneumatically, hydraulically, or electrically.

The invention claimed is:

1. A cockpit for a two-wheeled vehicle, comprising: a base body, on which a display and a steering handle are attached, wherein the base body is pivotably mounted at a bodywork of the two-wheeled vehicle, wherein the base body is connected to the bodywork at an at least approximately horizontally extending axis of pivot, wherein the bodywork includes a windshield frame, and wherein the axis of pivot is situated in a region of the windshield frame.

2. The cockpit according to claim 1, wherein the base body is lockable in at least two positions with respect to the bodywork.

3. The cockpit according to claim 2, wherein the base body is lockable with respect to the bodywork by a quick release.

4. The cockpit according to claim 1, wherein the base body can be arranged in defined locked positions with respect to the bodywork.

5. The cockpit according to claim 1, wherein the base body is formed as a frame, which surrounds the display at least partially.

6. The cockpit according to claim 1, wherein the steering handle has a plurality of control elements.

7. The cockpit according to claim 6, wherein the control elements comprise a throttle grip, a brake lever, and/or a blinker switch.

8. The cockpit according to claim 1, wherein the axis of pivot is situated proximate a lower edge of the windshield frame.

9. The cockpit according to claim 1, wherein the base body and the axis of pivot are enclosed by the bodywork of the two-wheeled vehicle.

* * * * *